(12) United States Patent
Lu (10) Patent No.: US 9,125,166 B2
(45) Date of Patent: Sep. 1, 2015

(54) METHODS FOR PERFORMING AN EFFICIENT NETWORK SEARCH AND COMMUNICATIONS APPARATUSES UTILIZING THE SAME

(71) Applicant: MediaTek Inc., Hsin-Chu (TW)

(72) Inventor: Tsung-Chi Lu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 101 days.

(21) Appl. No.: 13/670,661

(22) Filed: Nov. 7, 2012

(65) Prior Publication Data

US 2013/0121218 A1   May 16, 2013

Related U.S. Application Data

(60) Provisional application No. 61/559,884, filed on Nov. 15, 2011.

(51) Int. Cl.
*H04W 60/00* (2009.01)
*H04W 48/18* (2009.01)
*H04W 48/16* (2009.01)
*H04W 88/06* (2009.01)

(52) U.S. Cl.
CPC .............. *H04W 60/00* (2013.01); *H04W 48/16* (2013.01); *H04W 48/18* (2013.01); *H04W 88/06* (2013.01)

(58) Field of Classification Search
CPC ..................................................... H04W 60/00

USPC ......... 370/276, 280, 281, 294, 295, 338, 328, 370/225, 241, 255, 252, 254, 277; 455/434, 455/435.3, 403
See application file for complete search history.

(56) References Cited

U.S. PATENT DOCUMENTS 6,704,346 B1 * 3/2004 Mansfield ..................... 375/136
7,013,140 B2 * 3/2006 Ostberg et al. ................ 455/434
(Continued)

FOREIGN PATENT DOCUMENTS

CN           101621308 A      1/2010

OTHER PUBLICATIONS

English Abstract translation of CN101621308 (Published Jan. 6, 2010).

*Primary Examiner* — Habte Mered
*Assistant Examiner* — Rownak Islam
(74) *Attorney, Agent, or Firm* — McClure, Qualey & Rodack, LLP (57) ABSTRACT

A communications apparatus includes at least a first processor logic unit obtaining a support band list, a second processor logic unit generating a frequency search list for a first operating band and a frequency search list for a second operating band listed in the support band list, and a third processor logic unit performing power scan and cell search according to the frequency search lists. The frequency search list includes information regarding operating frequencies located in the corresponding operating band to be searched. The second operating band includes one or more operating frequencies overlapped with that of the first operating band, and the one or more operating frequencies of the second operating band overlapped with that of the first operating band is/are listed only in one of the frequency search list for the first operating band and the frequency search list for the second operating band.

13 Claims, 11 Drawing Sheets

(56) References Cited

U.S. PATENT DOCUMENTS

| | | | |
|---|---|---|---|
| 8,023,896 B2* | 9/2011 | Hildebrand et al. | 455/62 |
| 8,145,214 B2* | 3/2012 | Brandt | 455/434 |
| 2004/0233888 A1* | 11/2004 | Bonta et al. | 370/350 |
| 2007/0042775 A1 | 2/2007 | Umatt et al. | |
| 2008/0119145 A1* | 5/2008 | Lee et al. | 455/101 |
| 2009/0131048 A1 | 5/2009 | Kuriyama | |
| 2010/0081433 A1* | 4/2010 | Lee | 455/434 |
| 2013/0007039 A1* | 1/2013 | Edara | 707/769 |

* cited by examiner

FIG. 1

| Operating Band | Uplink (UL) operating band $F_{UL\_low} - F_{UL\_high}$ | Downlink (DL) operating band $F_{DL\_low} - F_{DL\_high}$ | Duplex Mode |
|---|---|---|---|
| 1 | 1920 MHz - 1980 MHz | 2110 MHz - 2170 MHz | FDD |
| 2 | 1850 MHz - 1910 MHz | 1930 MHz - 1990 MHz | FDD |
| 3 | 1710 MHz - 1785 MHz | 1805 MHz - 1880 MHz | FDD |
| 4 | 1710 MHz - 1755 MHz | 2110 MHz - 2155 MHz | FDD |
| 5 | 824 MHz - 849 MHz | 869 MHz - 894 MHz | FDD |
| 6 | 830 MHz - 840 MHz | 875 MHz - 885 MHz | FDD |
| 7 | 2500 MHz - 2570 MHz | 2620 MHz - 2690 MHz | FDD |
| 8 | 880 MHz - 915 MHz | 925 MHz - 960 MHz | FDD |
| 9 | 1749.9 MHz - 1784.9 MHz | 1844.9 MHz - 1879.9 MHz | FDD |
| 10 | 1710 MHz - 1770 MHz | 2110 MHz - 2170 MHz | FDD |
| 11 | 1427.9 MHz - 1447.9 MHz | 1475.9 MHz - 1495.9 MHz | FDD |
| 12 | 699 MHz - 716 MHz | 729 MHz - 746 MHz | FDD |
| 13 | 777 MHz - 787 MHz | 746 MHz - 756 MHz | FDD |
| 14 | 788 MHz - 798 MHz | 758 MHz - 768 MHz | FDD |
| 15 | Reserved | Reserved | FDD |
| 16 | Reserved | Reserved | FDD |
| 17 | 704 MHz - 716 MHz | 734 MHz - 746 MHz | FDD |
| 18 | 815 MHz - 830 MHz | 860 MHz - 875 MHz | FDD |
| 19 | 830 MHz - 845 MHz | 875 MHz - 890 MHz | FDD |
| 20 | 832 MHz - 862 MHz | 791 MHz - 821 MHz | FDD |
| 21 | 1447.9 MHz - 1462.9 MHz | 1495.9 MHz - 1510.9 MHz | FDD |
| ... | | | |

| ... | | | |
|---|---|---|---|
| 33 | 1900 MHz - 1920 MHz | 1900 MHz - 1920 MHz | TDD |
| 34 | 2010 MHz - 2025 MHz | 2010 MHz - 2025 MHz | TDD |
| 35 | 1850 MHz - 1910 MHz | 1850 MHz - 1910 MHz | TDD |
| 36 | 1930 MHz - 1990 MHz | 1930 MHz - 1990 MHz | TDD |
| 37 | 1910 MHz - 1930 MHz | 1910 MHz - 1930 MHz | TDD |
| 38 | 2570 MHz - 2620 MHz | 2570 MHz - 2620 MHz | TDD |
| 39 | 1880 MHz - 1920 MHz | 1880 MHz - 1920 MHz | TDD |
| 40 | 2300 MHz - 2400 MHz | 2300 MHz - 2400 MHz | TDD |

| Mobile Country Code | Mobile Network Code | Duplex Mode | Licensed Band |
|---|---|---|---|
| MCC_1 | MNC_1 | TDD | |
| | MNC_2 | TDD | |
| | ... | ... | |
| | MNC_N | TDD | |
| ~ | ~ | ~ | |
| MCC_N | MNC_1 | FDD | |
| | MNC_2 | FDD | |
| | ... | ... | |
| | MNC_N | FDD | |

METHODS FOR PERFORMING AN EFFICIENT NETWORK SEARCH AND COMMUNICATIONS APPARATUSES UTILIZING THE SAME

CROSS REFERENCE TO RELATED APPLICATIONS

This application claims the benefit of U.S. Provisional Application No. 61/559,884 filed Nov. 15, 2011 and entitled "Method of Full Band Search Pattern". The entire contents of which are hereby incorporated by reference.

BACKGROUND OF THE INVENTION

1. Field of the Invention

The invention relates to several efficient network search methods, and more particular, to efficient full band network search methods with greatly reduced network search time.

2. Description of the Related Art

The term "wireless" normally refers to an electrical or electronic operation that is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to other parties from many locations world-wide. They can be used anywhere, as long as there is a cellular telephone site to house equipment that can transmit and receive signals, which are processed to transfer both voice and data to and from the cellular telephones.

In order to improve network search performance of a mobile communications device, such as a cellular telephone, a portable electronic device, a tablet computer, or any electronic device that can support wireless communications, several improved methods for full band search are provided.

BRIEF SUMMARY OF THE INVENTION

Communications apparatuses and methods for performing an efficient network search are provided. An exemplary embodiment of a communications apparatus comprises a processor coupled to at least a radio transceiver and a baseband processing device. The processor at least comprises a first processor logic unit, a second processor logic unit and a third processor logic unit. The first processor logic unit obtains a support band list comprising information regarding a plurality of operating bands supported by the communications apparatus for wireless communications. Each operating band ranges over a plurality of operating frequencies. The second processor logic unit generates a frequency search list for a first operating band listed in the support band list and a frequency search list for a second operating band listed in the support band list. The frequency search list comprises information regarding one or more operating frequencies located in the corresponding operating band to be searched. The third processor logic unit performs power scan and cell search according to the frequency search list for the first operating band and the frequency search list for the second operating band. The second operating band comprises one or more operating frequencies overlapped with one or more operating frequencies of the first operating band, and the one or more operating frequencies of the second operating band over- lapped with that of the first operating band is/are listed only in one of the frequency search list for the first operating band and the frequency search list for the second operating band.

An exemplary embodiment of a method executed by a processor of a communications apparatus for performing an efficient network search comprises: generating a frequency search list for a first operating band listed in a support band list, wherein the support band list comprises information regarding a plurality of operating bands supported by the communications apparatus for wireless communications, each operating band ranges over a plurality of operating frequencies, and the frequency search list comprises information regarding one or more operating frequencies located in the first operating band to be searched; obtaining a frequency exclusion list corresponding to the first operating band, wherein the frequency exclusion list comprises information regarding one or more operating bands having one or more operating frequencies overlapped with one or more operating frequencies of the first operating band; obtaining information regarding a second operating band from the frequency exclusion list corresponding to the first operating band; determining whether a frequency search list for the second operating band has been generated; excluding one or more operating frequencies of the first operating band overlapped with that of the second operating band from the frequency search list for the first operating band when the frequency search list for the second operating band has been generated; and performing power scan and cell search on the one or more operating frequencies in the frequency search list for the first operating band.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
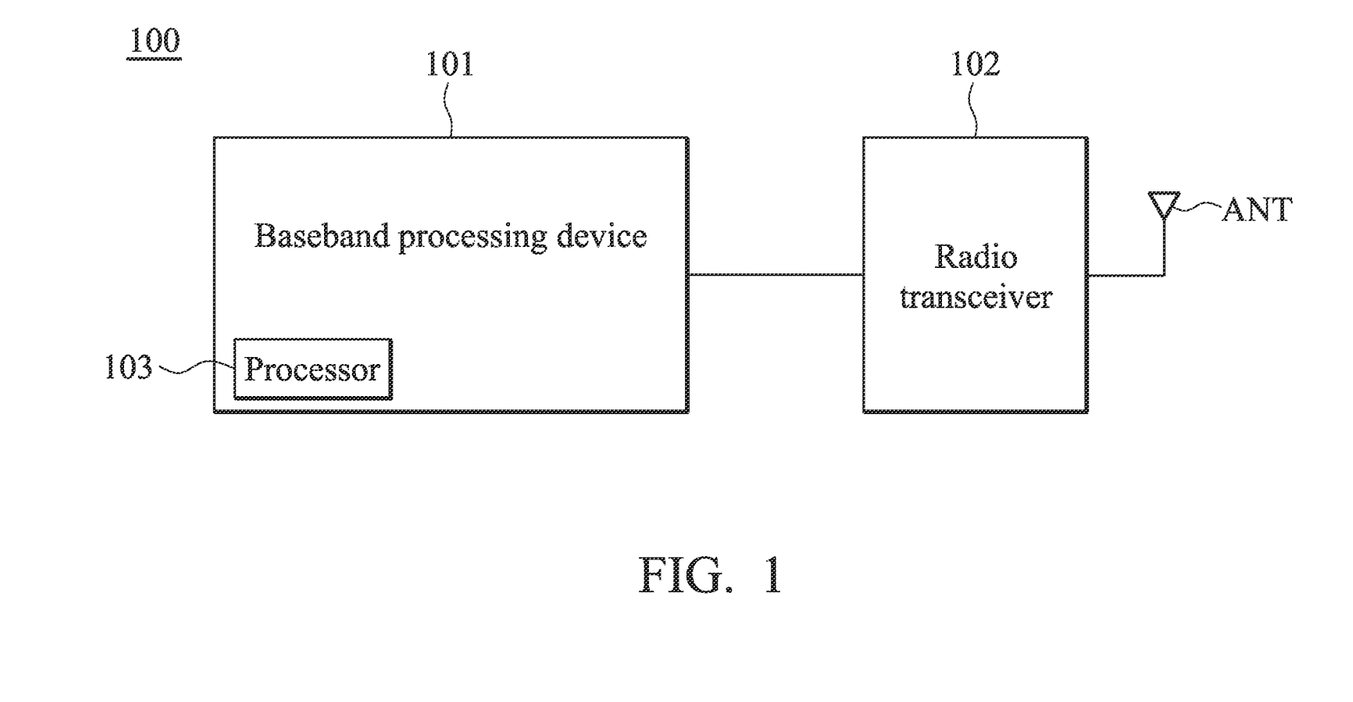
FIG. 1 shows a block diagram of a communications apparatus according to an embodiment of the invention.

FIG. 1 shows a block diagram of a communications apparatus according to an embodiment of the invention. The communications apparatus 100 may comprise at least a baseband processing device 101, a radio transceiver 102, a processor 103 and an antenna ANT. The radio transceiver 102 may receive wireless radio frequency signals via the antenna ANT, convert the received signals to baseband signals to be processed by the baseband processing device 101, or receive baseband signals from the baseband processing device 101 and convert the received signals to wireless radio frequency signals to be transmitted to a peer communications device. The radio transceiver 102 may comprise a plurality of hardware devices to perform radio frequency conversion. For example, the radio transceiver 102 may comprise a mixer to multiply the baseband signals with a carrier oscillated in the radio frequency of the wireless communications system, such as a Long Term Evaluation (LTE) system, an LTE advanced system, or others, depending on the radio access technology (RAT) in use.

The baseband processing device 101 may further convert the baseband signals to a plurality of digital signals, and process the digital signals, and vice versa. The baseband processing device 101 may also comprise a plurality of hardware devices to perform baseband signal processing, such as the processor 103, which may be a digital signal processor, or others. The baseband signal processing may comprise analog to digital conversion (ADC)/digital to analog conversion (DAC), gain adjustments, modulation/demodulation, encoding/decoding, and so on. Note that in some embodiments of the invention, the communications apparatus 100 may further comprise another central processor (not shown) configured outside of the baseband processing device 101 for controlling the operations of the baseband processing device 101, the radio transceiver 102, and a memory device (not shown) which stores the system data and program codes of the communications apparatus 100. Therefore, the invention should not be limited to the architecture as shown in FIG. 1.

Note further that in some embodiments of the invention, the processor 103 may also be configured outside of the baseband processing device 101 as the central processor for controlling the operations of the baseband processing device 101, the radio transceiver 102, and the memory device, and therefore, the invention should not be limited to the architecture as shown in FIG. 1. Note further that in still some embodiments of the invention, the communications apparatus may comprise more than one baseband processing device, more than one radio transceiver and/or more than one antenna for supporting multi-mode wireless communications and/or Multiple-Input Multiple Output (MIMO) communications, and therefore, the invention should not be limited to the architecture as shown in FIG. 1.

According to an embodiment of the invention, the processor 103 may be arranged to execute the program codes of the corresponding software module(s) of the baseband processing device 101 and/or the radio transceiver 102. The program codes accompanied with specific data in a data structure may also be referred to as a processor logic unit or a stack instance when being executed. Therefore, the processor 103 may be regarded as comprising a plurality of processor logic units each for executing one or more specific functions or tasks of the corresponding software module(s).

Generally, a communications apparatus (e.g. the communications apparatus 100) may perform a full band network search procedure to search for one or more candidate suitable cells or collect network information in some scenarios, for example, like for initial network entry, out of service recovery, Public Land Mobile Network (PLMN) list generation, or the likes. The full band network search procedure may be performed by power or frequency scanning all of the operating bands supported by the communications apparatus and further conducting a cell search on the operating frequencies having a sufficiently strong enough signal power carried thereon, until a stop condition is met. The stop condition may be, for example, one or more candidate suitable cells have been found, all of the operating bands have been scanned, all of the essential network information (for example, the master information blocks and system information blocks) has been collected, or others.

Figure 2A:
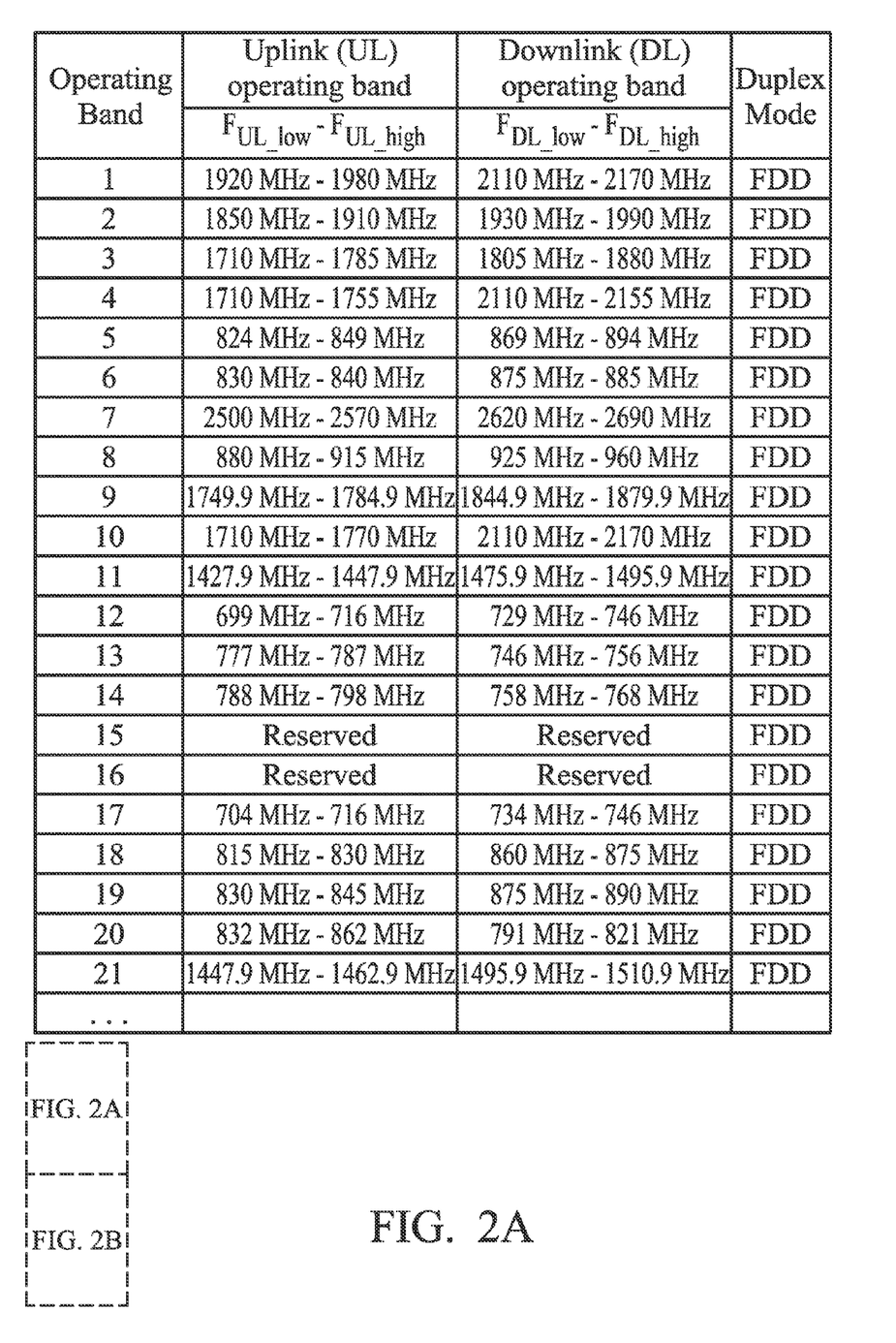
FIG. 2A and FIG. 2B show a table listing operating bands and the corresponding duplex mode utilized in the LTE system.
Figure 2B:
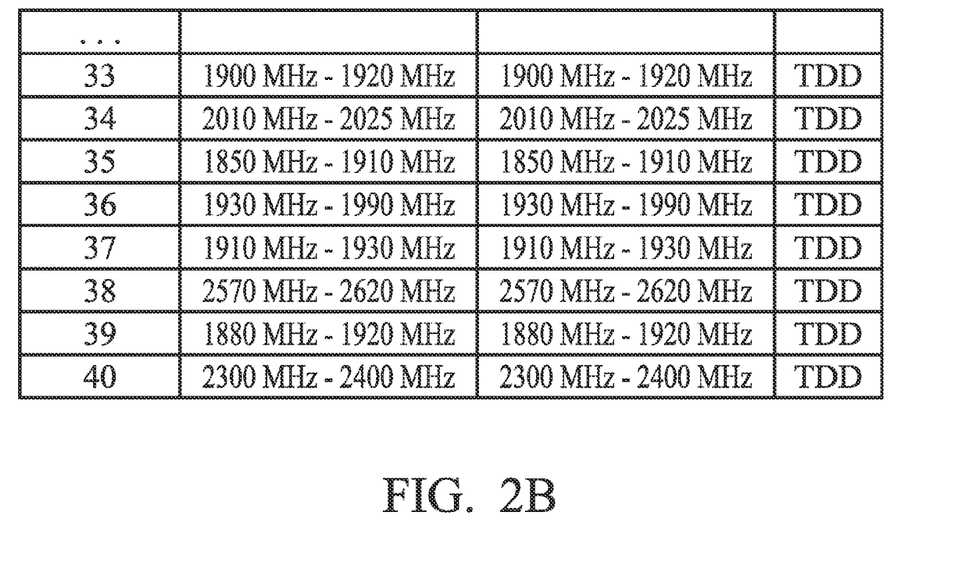

FIG. 2A and FIG. 2B show a table listing operating bands and the corresponding duplex mode utilized in the LTE system. The duplex mode utilized in the LTE system may comprise a Time Division Duplex (TDD) mode and a Frequency Division Duplex (FDD) mode. As shown in FIG. 2A and FIG. 2B, the operating bands are numbered from band 1 to band 40. Each operating band ranges over a plurality of operating frequencies. For example the operating frequency of band 35 ranges over 1850 MHz~1910 MHz. Note that there are several operating bands having one or more operating frequencies overlapped with that of one or more other operating bands. For example, the operating band 35 is overlapped with the operating band 39 from 1880 MHz to 1910 MHz. Since it is always very time consuming when performing the full band network search procedure, several efficient full band network search methods, with some overlapped or even non-overlapped operating frequencies to be searched being skipped, are provided to reduce the time consumed for performing the full band network search procedure.

Before performing a full band network search procedure, the processor (e.g. the processor 103) may first obtain a support band list stored in a non-volatile memory of the communications apparatus (e.g. the communications apparatus 100). The support band list may be written into a non-volatile memory of the communications apparatus when manufacturing the communications apparatus, and may comprise information regarding a plurality of operating bands supported by the communications apparatus for wireless communications. Since all of the operating frequencies of the operating bands supported by the communications apparatus is supposed to be scanned in the full band network search procedure until the stop condition is met, it is preferably for the processor to generate a frequency search list for each operating band. In the embodiments of the invention, the frequency search list may comprise information regarding the operating frequencies located in the corresponding operating band to be searched. After the frequency search lists for the operating bands to be searched are generated, the processor may begin the full band network search procedure, and detect signal power of the operating frequencies listed in the frequency search list for each operating band so as to search for any possible cell. When any possible cell with sufficient signal power is detected, the processor may further collect essential network information corresponding to that cell, or perform a subsequent procedure to try to synchronize the timing and frequency with that cell and identify whether it is a suitable cell for providing wireless communications services (for example, whether it is a cell belonging to the same RAT as the communications apparatus uses).

According to a first aspect of the invention, several concepts of generating the frequency search list with overlapped operating frequencies in one or more operating bands to be searched being excluded are provided. When the overlapped operating frequencies are excluded from the frequency search lists, the time consumed for performing the full band network search procedure can be greatly reduced.

Figure 3A:
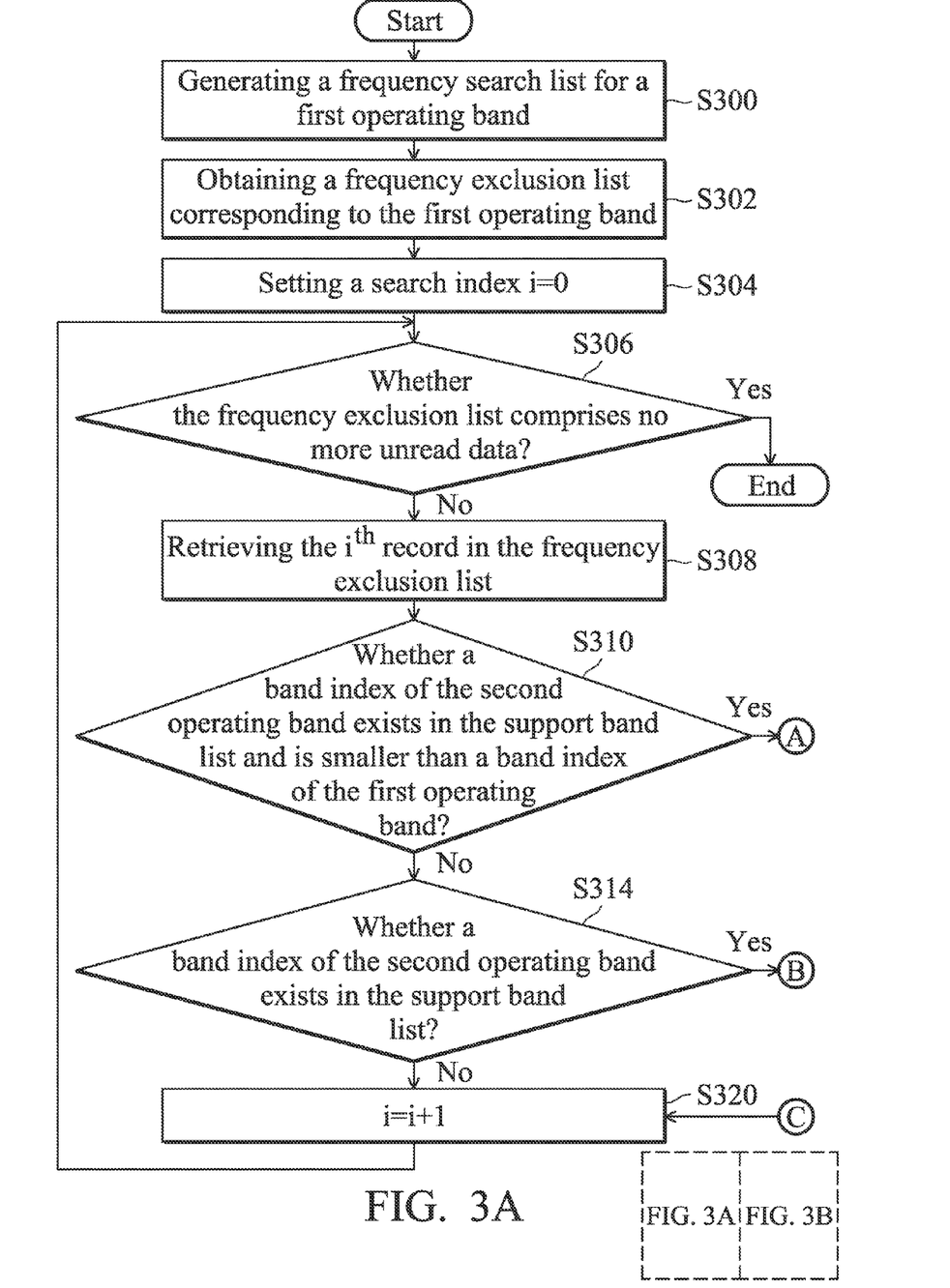
FIG. 3A and FIG. 3B in combination is a flow chart showing a method for performing an efficient network search according to a first aspect of the invention.
Figure 3B:
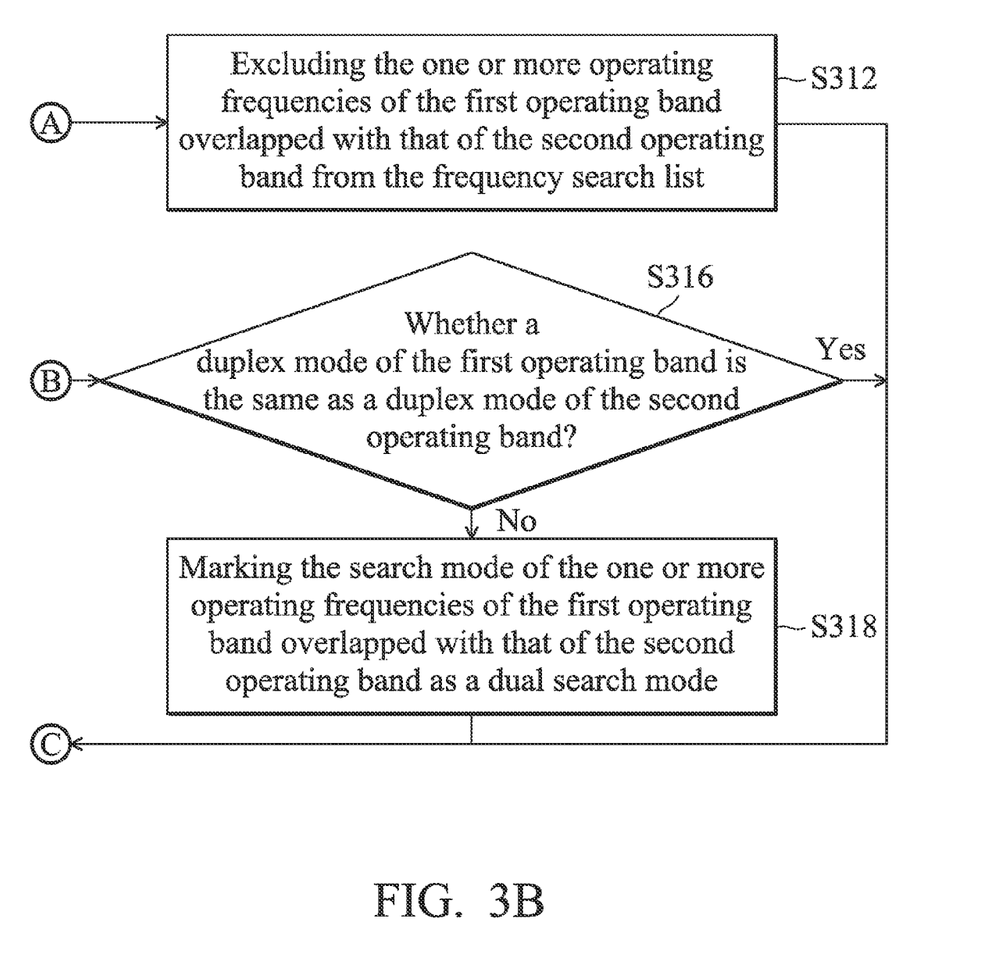

FIG. 3A and FIG. 3B in combination is a flow chart showing a method for performing an efficient network search according to the first aspect of the invention. The processor (e.g. the processor 103) may first generate a frequency search list for a first operating band listed in the support band list (Step S300). In the embodiments of the invention, the frequency search list may initially comprise all of the operating frequencies located in the first operating band, and a search mode for each operating frequency may be marked as the duplex mode (for example, TDD or FDD) of the first operating mode. Next, the processor may further obtain a frequency exclusion list corresponding to the first operating band (Step S302). According to an embodiment of the invention, the frequency exclusion list corresponding to the first operating band may comprise information regarding one or more operating bands having one or more operating frequencies overlapped with one or more operating frequencies of the first operating band. According to an embodiment of the information, the frequency exclusion list may be represented in a form of a table and may be stored in the memory device of the communications apparatus.

The frequency exclusion list may store N records (or entries), where N is the number of operating bands having one or more operating frequencies overlapped with that of the first operating band. According to an embodiment of the invention, each record in the frequency exclusion list corresponding to the first operating band may comprise at least a first field recording a band index of the operating band having the one or more operating frequencies overlapped with that of the first operating band, a second field recording an index or a frequency of a start operating frequency overlapped with that of the first operating band, and a third field recording a range of the operating frequencies overlapped with that of the first operating band. Take the operating band 5 shown in FIG. 2A and FIG. 2B as an example, since the operating band 5 is overlapped with the operating band 6 from 875 MHz to 885 MHz, overlapped with the operating band 18 from 869 MHz to 875 MHz, and overlapped with the operating band 19 from 875 MHz to 890 MHz, there may be three records comprised in the frequency exclusion list of the operating band 5. Further, take the record of the operating band 18 as an example, the first field may record a value of 18 for indicating that the overlapped operating band is the band 18, the second field may record a value of 869 for indicating that the a start overlapped operating frequency is 869 MHz, and the third field may record a value of 6 for indicating that a range of the overlapped operating frequencies is 6 MHz. Note that in some embodiments of the invention, since the operating frequencies are generally scanned every 100 KHz (that is, a search step is set to 100 KHz, which is an EARFCN (E-UTRA Absolute Radio Frequency Channel Number) step), the second field may record a value of 0 for indicating the start of an overlapped operating frequency occurring at the first ($0^{th}$) scan of the first operating band, and the third field may record a value of 60 for indicating that a range of the overlapped operating frequencies is 60 scan steps.

After obtaining the frequency exclusion list corresponding to the first operating band, the processor may further set a search index i=0 (Step S304). The search index i is utilized for retrieving the records stored in the frequency exclusion list. Next, the processor may check whether the frequency exclusion list comprises no more unread data (Step S306). The frequency exclusion list may comprise no more unread data when the frequency exclusion list is empty (that is, there is no other operating band having operating frequency overlapped with the ongoing first operating band) or when all the records in the frequency exclusion list have been read. If so, the process ends. If not, the processor may obtain information regarding a second operating band having one or more operating frequencies overlapped with that of the first operating band by retrieving the $i^{th}$ record in the frequency exclusion list (Step S308). Next, the processor may further determine whether a band index of the second operating band exists in the support band list and is smaller than a band index of the first operating band (Step S310). Note that in this embodiment, it is supposed that generation of the frequency search lists for the support operating bands to be searched in a full band search procedure is performed in an ascending order. That is, generation of the frequency search list for an operating band with a smallest band index in the support band list is performed the earliest and generation of the frequency search list for an operating band with a largest band index in the support band list is performed the latest. Therefore, when the band index of the second operating band exists in the support band list and is smaller than a band index of the first operating band, it means that the frequency search list for the second operating band has already been generated.

If so, the one or more operating frequencies of the first operating band overlapped with that of the second operating band is/are excluded from (that is, not comprised in) the frequency search list for the first operating band (Step S312). If not, the processor may further determine whether a band index of the second operating band exists in the support band list (Step S314). If so, it means that the band index of the second operating band exists in the support band list and the frequency search list for the second operating band has not been generated. Then, the processor may further determine whether a duplex mode of the first operating band is the same as a duplex mode of the second operating band (Step S316). If not, the processor may mark the search mode of the one or more operating frequencies of the first operating band overlapped with that of the second operating band as a dual search mode (that is, both the TDD cell and the FDD cell have to be searched when performing cell search within this overlapped range) (Step S318) and then increase the search index i by one (Step S320). On the other hand, when the frequency search list for the second operating band has not been generated and the duplex mode of the first operating band is the same as the duplex mode of the second operating band, the one or more operating frequencies of the first operating band overlapped with that of the second operating band will not be excluded from the frequency search list and the search mode of the operating frequencies may remain unchanged. Thereafter, the process goes to step S320 to increase the search index i by one. After increasing the search index i by one, the process return to step S306 to check whether the frequency exclusion list comprises no more unread data.

The flow chart as shown in FIG. 3A and FIG. 3B may be repeatedly performed for each operating band listed in the support band list, so as to generate the corresponding frequency search list for each support operating band. After the corresponding frequency search lists have been generated, the processor may perform the full band network search procedure (for example, perform the power scan and cell search) on the support operating bands according to their corresponding frequency search list. Based on the concept illustrated in the first aspect of the invention, since the overlapped operating frequencies are listed only in one the frequency search list (that is, excluded from the other frequency search list(s)), duplicated routine of searching the overlapped operating frequencies can be skipped, and therefore, the time consumed for performing the full band network search procedure can be greatly reduced. In addition, since the duplex modes of the overlapped operating bands are also considered, some parts of duplicated routine of searching the overlapped operating frequencies (for example, collecting downlink signals) for different duplex modes may be skipped and the time consumed for performing the full band network search procedure can also be reduced.

Figure 4:
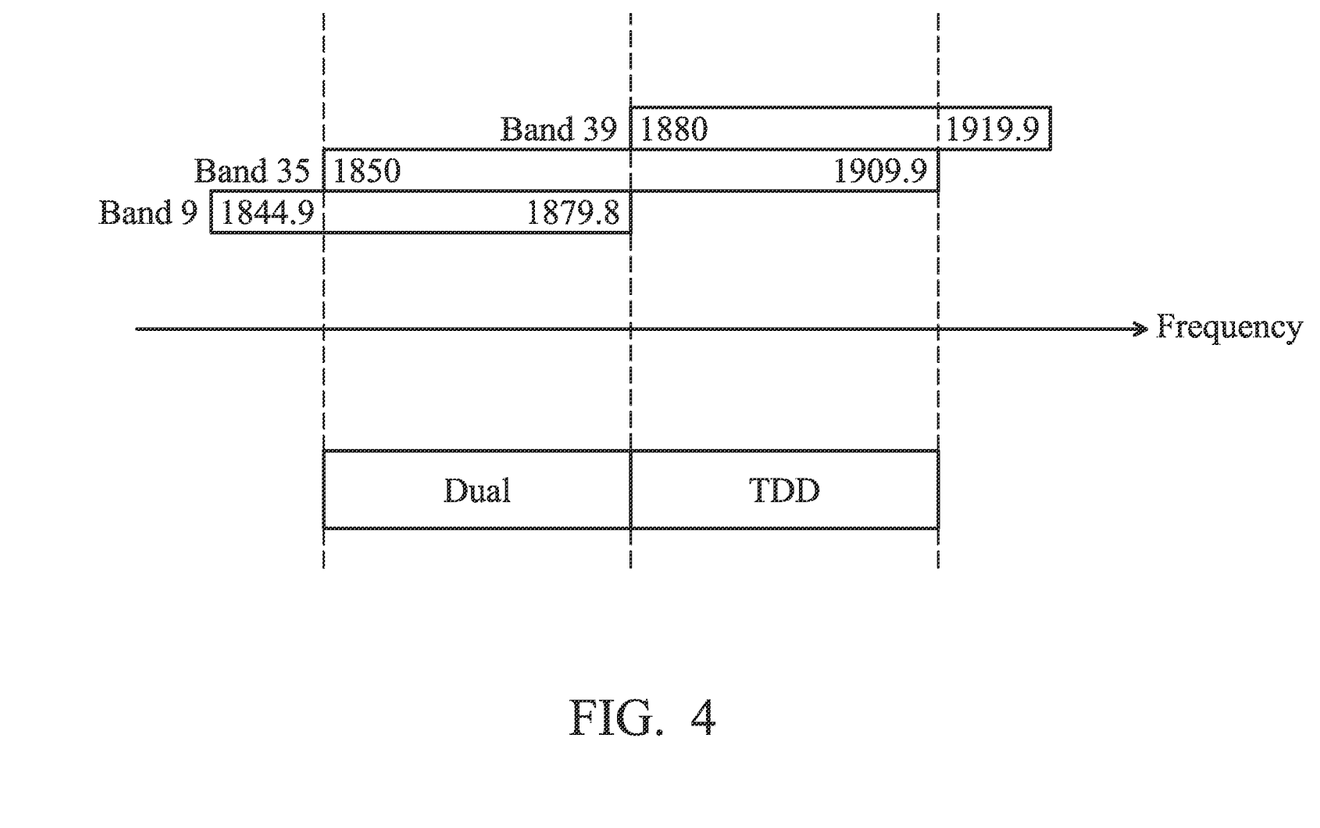
FIG. 4 is an exemplary diagram showing a concept of generating a frequency search list according to an embodiment of the invention.

FIG. 4 is an exemplary diagram showing a concept of generating a frequency search list for band 35 according to an embodiment of the invention. As shown in FIG. 4, since a duplex mode of band 9 is FDD but a duplex mode of band 35 is TDD, a search mode from 1844.9 MHz~1879.9 MHz is marked as a dual search mode (that is, both the TDD cell and the FDD cell have to be searched when performing cell search within this overlapped range). In addition, since a duplex mode of band 35 and band 39 are both TDD, a search mode from 1880 MHz~1910 MHz is marked as a TDD mode (that is, only the TDD cell has to be searched when performing cell search within this overlapped range).

Suppose that all the operating bands of a communications system (for example, the LTE system) are supported by the communications apparatus and a scan step is set to 100 KHz, based on conventional full band network search method, a number of operating frequencies that have to be scanned (or searched) is 9810. When applying the concept of excluding the overlapped operating frequency in the frequency search list as illustrated above, the number of operating frequencies that have to be scanned (or searched) can be reduced to 6500. Therefore, based on the concept in the first aspect of the invention, about 34% (that is, 1-6500/9810) of the search time can be reduced. In preferred embodiments of the invention, the operating bands listed in the support band list are preferably the operating bands of the same Radio Access Technology (RAT). That is, the exclusion of the overlapped operating frequencies is preferably applied when performing the intra-RAT full band network search.

According to a second aspect of the invention, some non-overlapped operating frequencies can further be excluded or skipped during the full band network search procedure. When some operating frequencies are further excluded or skipped during the full band network search procedure, the time consumed for performing the full band network search procedure can further be reduced.

Figure 5:
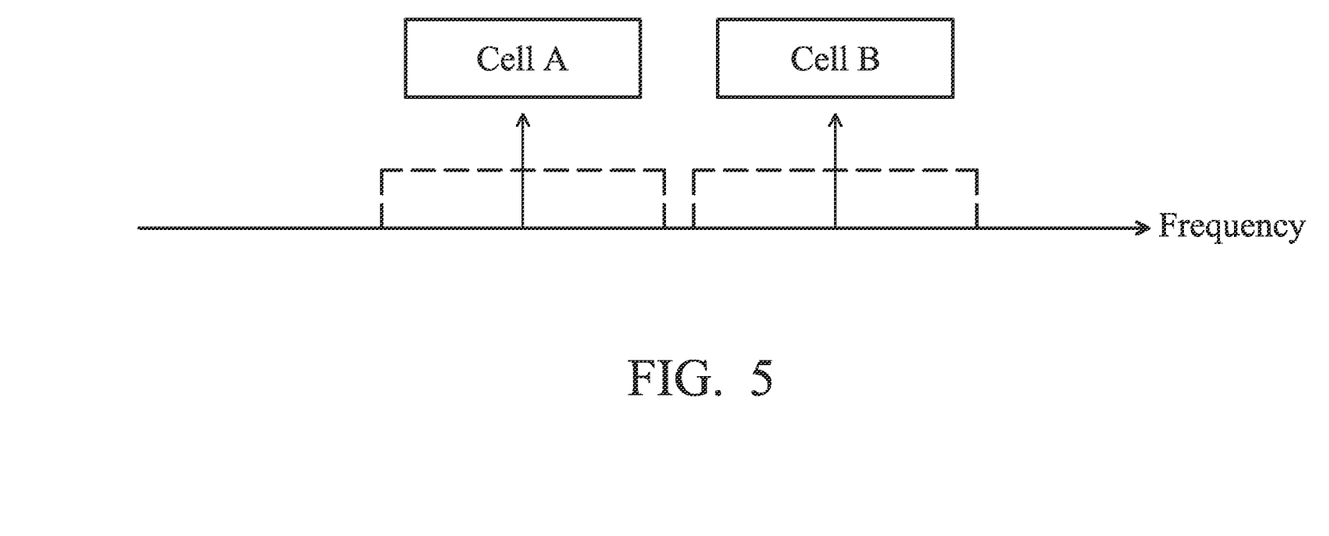
FIG. 5 is a diagram showing the allocations of two adjacent cells belonging to the same network operator according to an embodiment of the invention.

Generally, the network operator would follow a channel allocation rule to allocate their cell. That is, the operating frequencies of two adjacent cells should not overlap with each other so as to avoid mutual interference. FIG. 5 is a diagram showing the allocations of two adjacent cells belonging to the same network operator according to an embodiment of the invention. As shown in FIG. 5, the cell range of Cell A and Cell B does not overlap with each other. For the case when there are two adjacent cells belonging to different network operators, the cell ranges of the two adjacent cells may overlap with each other. However, when the signal quality of one cell is strong enough (for example, greater than a predetermined threshold), the signal quality of another cell having the cell range overlapped with this strong cell would be undetectable.

Based on the two hypotheses illustrated above, according to the second aspect of the invention, after a master information block (MIB) of a specific cell is successfully received and the signal quality of the specific cell is determined to have exceeded a predetermined threshold, a subsequent BW/2 frequency range can be skipped or excluded from the frequency search list for a corresponding operating band, where BW is the bandwidth of the specific cell. Note that information regarding the downlink bandwidth BW of the specific cell may be retrieved from the MIB of the specific cell.

Figure 6:
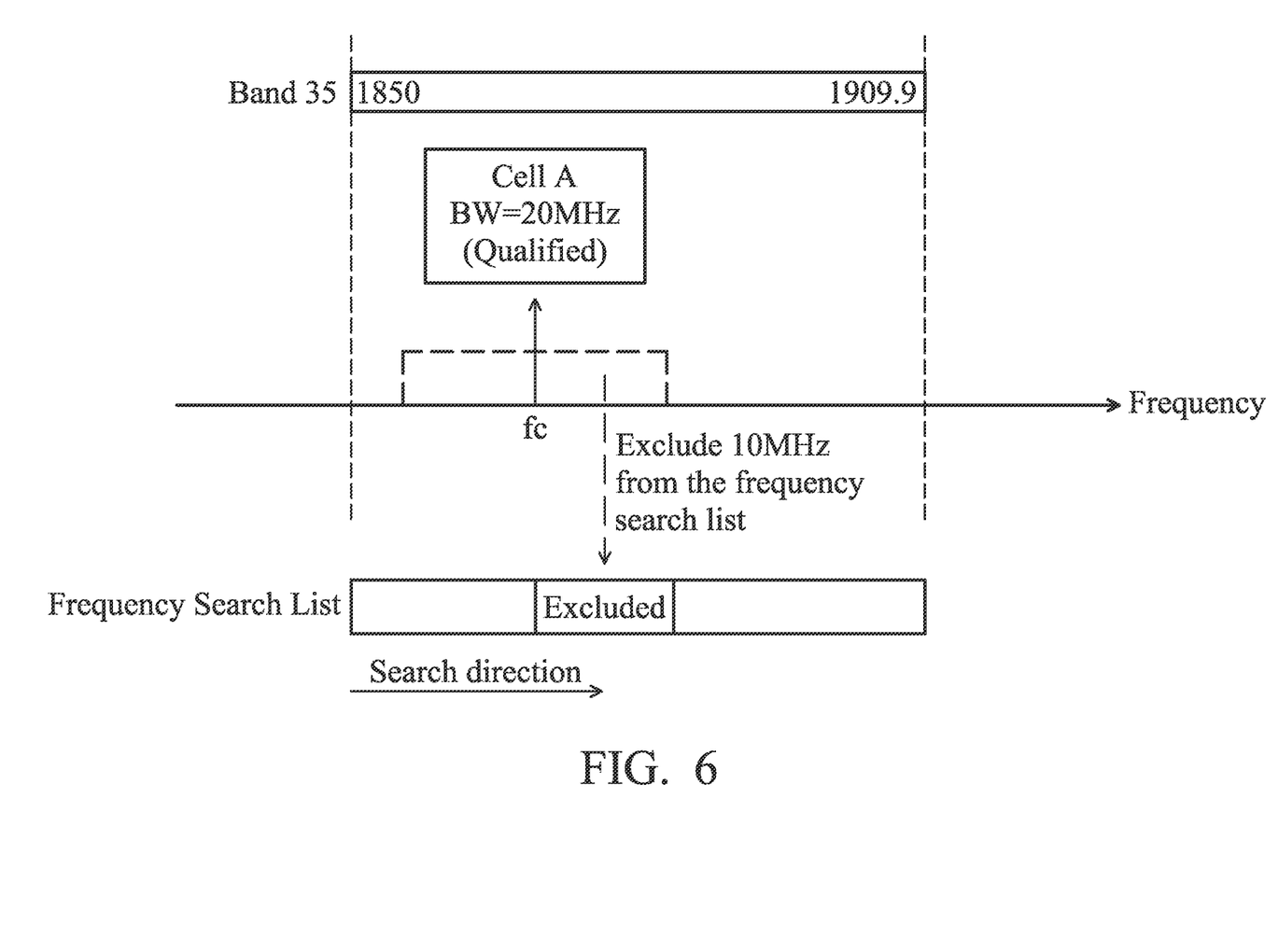
FIG. 6 is a diagram showing a concept of skipping or excluding some operating frequencies from the frequency search list for corresponding operating bands according to an embodiment of the invention.

FIG. 6 is a diagram showing a concept of skipping or excluding some operating frequencies from the frequency search list for corresponding operating bands according to an embodiment of the invention. When the MIB of cell A is successfully received and signal quality of cell A cell is determined to be qualified for exceeding a predetermined threshold, a subsequent BW/2 frequency range after the central frequency fc of cell A can be excluded from the frequency search list for the corresponding operating band. Therefore, since cell A is located within band 35 and a bandwidth of cell A is 20 MHz, a 10 MHz frequency range after the operating frequency fc can be excluded from the frequency search list for band 35 as shown in FIG. 6.

Suppose that there are 10 cells with 20 MHz cell bandwidths which can be skipped or excluded from the frequency search list for corresponding operating bands, the number of operating frequencies that can be skipped and will not be scanned can be 10*200/2=1000. When applying the concept of excluding the overlapped operating frequencies in the frequency search list as illustrated in the first aspect of the invention and the concept of excluding the BW/2 frequency ranges of qualified cells as illustrated in the second aspect of the invention, the number of operating frequencies that have to be scanned (or searched) can be further reduced to 5500. Therefore, based on the concept in the second aspect of the invention, about 15% (that is, 1-5500/6500) of the search time can further be reduced.

According to a third aspect of the invention, the order of operating bands to be searched in a full band network search procedure can be rearranged (that is, no longer be presented in an ascending or descending order) according to some network information. In this manner, for the scenario of out of service recovery, fast service recovery can be achieved.

A public land mobile network (PLMN) is a network that is established and operated by an administration or by a recognized operating agency (ROA) for the specific purpose of providing land mobile telecommunications services to the public. A PLMN identity is composed of two parts, a Mobile Country Code (MCC) and a Mobile Network Code (MNC). In this manner, the operator and the country can uniquely be recognized by a PLMN ID. The PLMN ID can be obtained from the system information. For example, in the LTE system, the PLMN ID can be obtained from the system information 1 (SIB1).

According to the third aspect of the invention, a country band table recording a relationship between the country, network and licensed band of the network may be established when manufacturing the communications apparatus, and contents of the country band table may further be updated according to the system information collected from currently or previously camped on cells, or from neighboring cells, after the communications apparatus is used.

Figure 7:
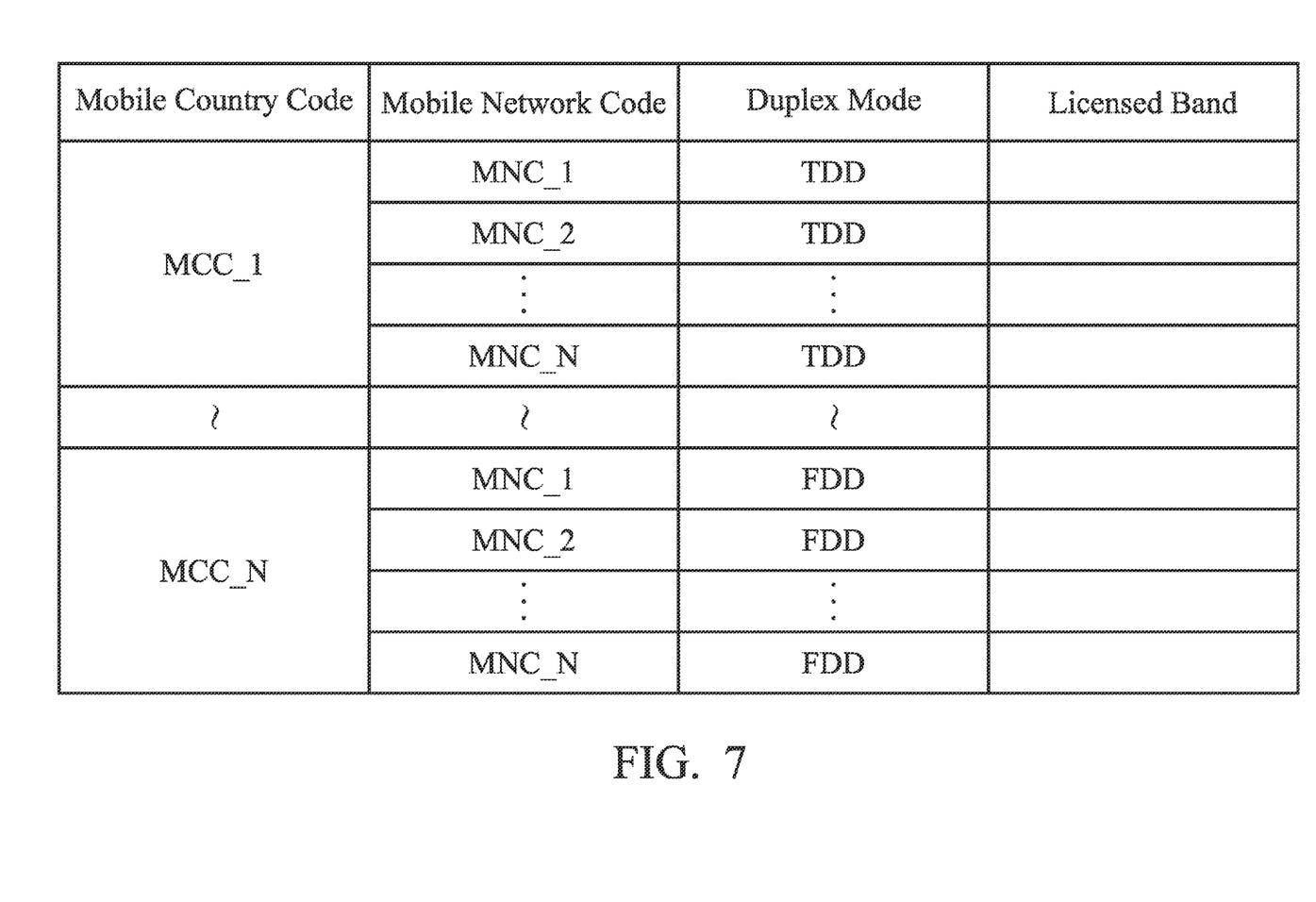
FIG. 7 shows an exemplary country band table recording a relationship between the country, network and licensed band of the network according to an embodiment of the invention.

FIG. 7 shows an exemplary country band table recording a relationship between the country, network and licensed band of the network according to an embodiment of the invention. As shown in FIG. 7, the mobile country codes MCC_1~MCC_N are recorded in the country band table. Each mobile country code may correspond to multiple mobile network codes MNC_1~MNC_N. In addition, information regarding the support duplex mode and licensed band for each PLMN are also recorded in the country band table.

According to an embodiment of the invention, after a PLMN ID corresponding to a specific cell is obtained during the full band network search procedure, the country and network can be identified. The processor (e.g. the processor 103) may look up the country band table to retrieve the information regarding the support duplex mode and licensed band corresponding to the PLMN ID and rearrange the order of operating bands to be searched in the subsequent full band network search procedure. For example, for the band in the support band list with the unsupported duplex mode, it may be moved to the bottom of a band search list. In addition, for the band in the support band list belonging to the unlicensed frequency band of the network operator, it may also be moved to the bottom of the band search list. Note that the band search list may initially list the operating bands to be searched in an ascending or descending order according to their band indexes. By rearranging the band search list based on the concept illustrated in the third aspect of the invention, the processor may locate the most possible cell earlier, for fast service recovery.

Figure 8A:
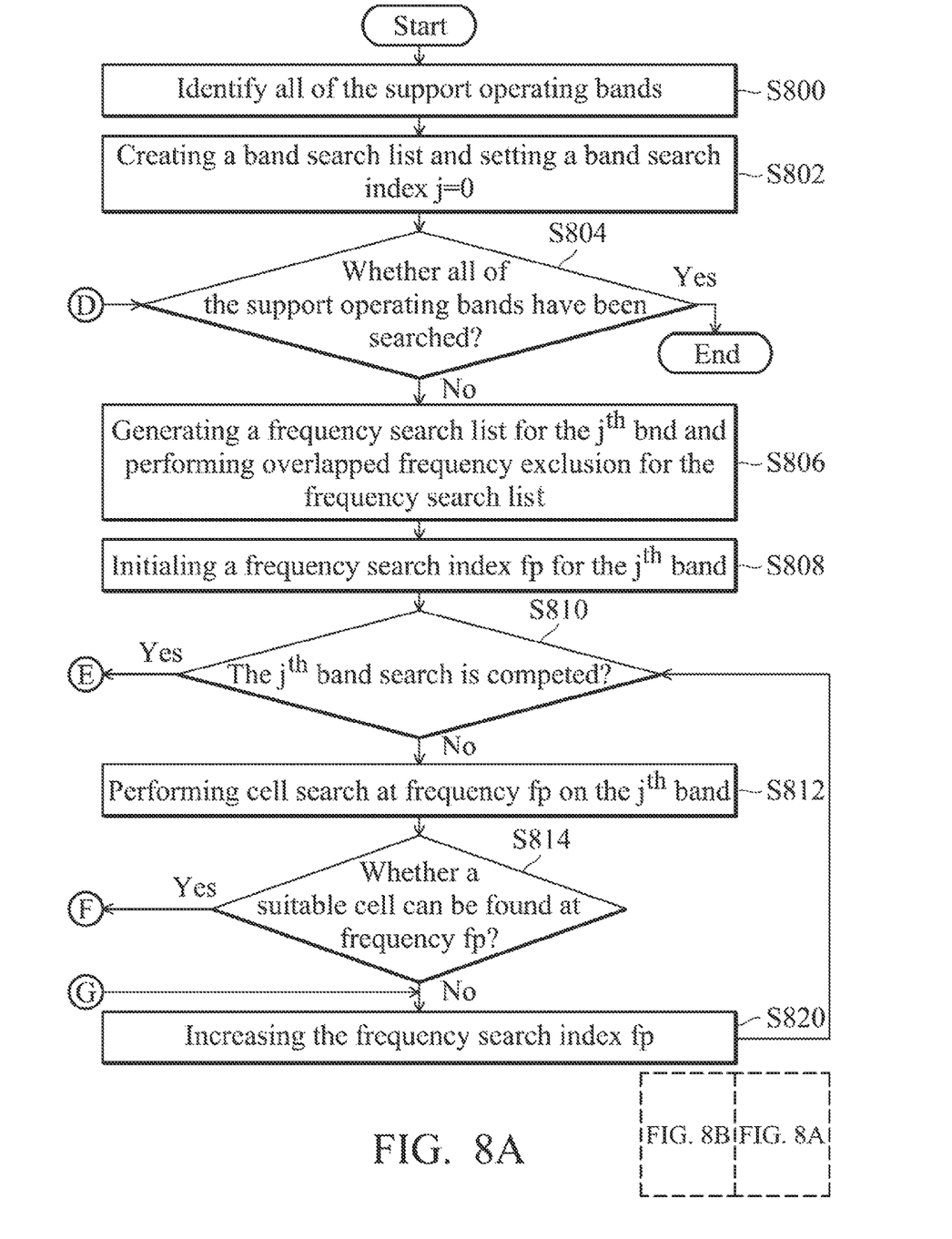
FIG. 8A and FIG. 8B in combination is an exemplary flow chart showing a method for performing an efficient network search by applying the concepts illustrated in the first, second and third aspects of the invention.
Figure 8B:
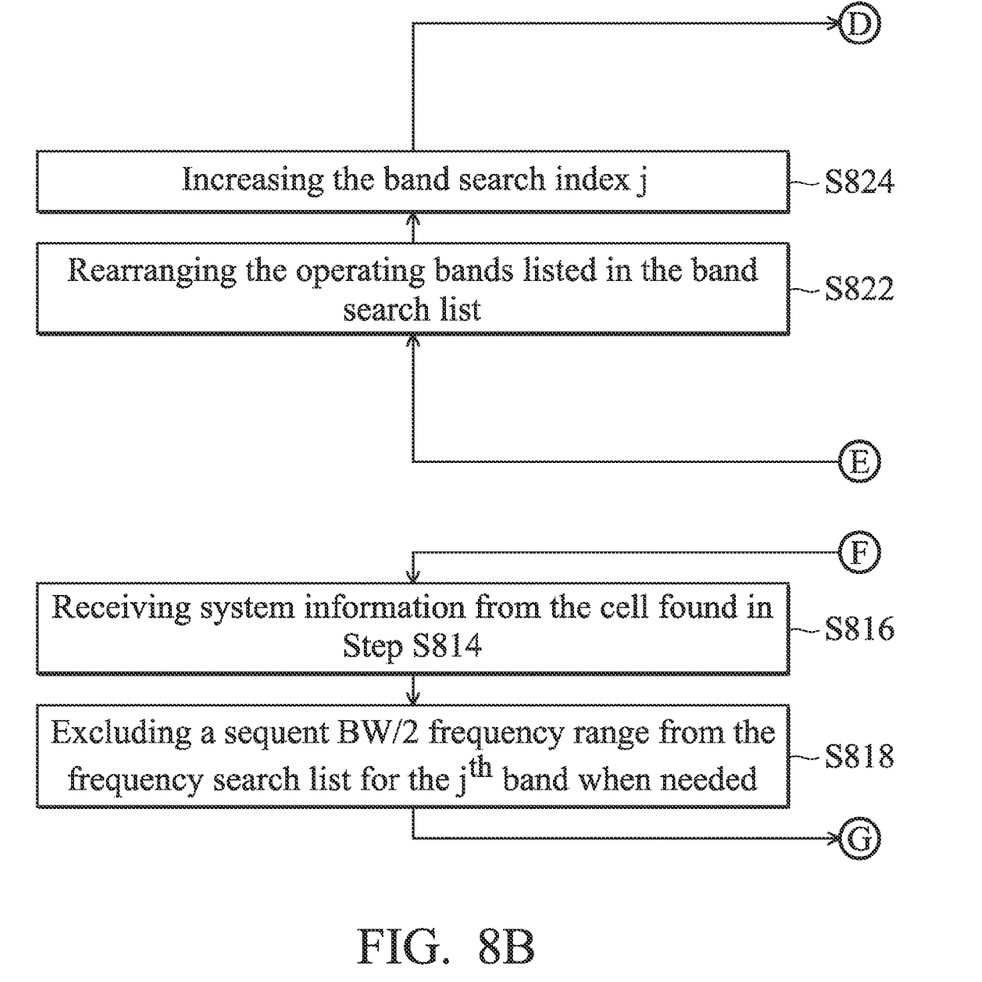

FIG. 8A and FIG. 8B in combination is an exemplary flow chart showing a method for performing an efficient network search by applying the concepts illustrated in the first, second and third aspects of the invention. The processor (e.g. the processor 103) may first identify all of the support operating bands (Step S800). Information regarding all of the support operating bands may be retrieved from a support band list stored in a memory device of the communications apparatus (e.g. the communications apparatus 100) as illustrated above. Next, the processor may create a band search list and set a band search index j=0 (Step S802). As described above, the band search list may initially list the operating bands to be searched in an ascending or descending order according to their band indexes.

Next, the processor may determine whether all of the support operating bands have been searched (Step S804). If so, the full band network search procedure is ended. If not, the processor may generate a frequency search list for the $j^{th}$ band and perform overlapped frequency exclusion for the frequency search list according to the embodiments in the first aspect of the invention (Step S806). After the overlapped operating frequencies have been excluded from the frequency search list, the processor may initialize a frequency search index fp for the $j^{th}$ band so as to start to perform cell search on the $j^{th}$ band (Step S808).

The processor may further determine whether the $j^{th}$ band search is completed (Step S810). The $j^{th}$ band search may be determined to be completed when all of the operating frequencies in the frequency search list have been scanned. If not, the processor may begin to perform cell search at the frequency fp on the j.sup.th band (Step S812). After step S812, the processor may further determine whether a suitable cell can be found at frequency fp (Step S814). If so, the processor may further receive system information from the cell found in Step S814 (Step S816) to retrieve information of the suitable cell (for example, a bandwidth of the suitable cell). The processor may further exclude a sequent BW/2 frequency range from the frequency search list after the frequency fp for the $j^{th}$ band when needed (Step S818) as illustrated in the second aspect of the invention. The exclusion of the sequent BW/2 frequency range may be determined to be needed when, for example, the signal quality of the cell found in step S814 is qualified.

Next, the processor may increase the frequency search index fp (Step S820) and the procedure may return to step S810 to check whether the $j^{th}$ band search is completed. The $j^{th}$ band search is completed when all of the operating frequencies in the frequency search list for the $j^{th}$ band have been searched. When the $j^{th}$ band search is completed, the processor may further rearrange the operating bands listed in the band search list as illustrated in the third aspect of the invention according to the PLMN ID obtained in the system information and the country band table (Step S822). Note that the step S822 is an optional step and is preferably to be introduced when performing the full band network search for out of service recovery. Next, the processor may increase the band search index j by one (Step S824) and the procedure may return to step S804 to check whether all of the support operating bands have been searched.

Note that in other embodiments of the invention, the concepts as illustrated in the first, second and third aspects of the invention may also be flexibly and individually applied in a full band network search procedure (that is, it is not limited to apply all of the concepts illustrated in the first, second and third aspects at the same time). Each concept in the first, second and third aspect can individually contribute to reduce the time needed for the full band network search procedure by a great amount as compared with conventional designs.

The above-described embodiments of the present invention can be implemented in any of numerous ways. For example, the embodiments may be implemented using hardware, software or a combination thereof It should be appreciated that any component or collection of components that perform the functions described above can be generically considered as one or more processors that control the above discussed functions. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   a memory device, storing a frequency exclusion list; and
   a processor,
   obtaining a support band list comprising information regarding a plurality of operating bands supported by the communications apparatus for wireless communications, wherein each operating band ranges over a plurality of operating frequencies,
   obtaining the frequency exclusion list,
   generating a frequency search list for a first operating band listed in the support band list and a frequency search list for a second operating band listed in the support band list according to the frequency exclusion list, wherein the frequency search list comprises information regarding one or more operating frequencies located in the corresponding operating band to be searched, and wherein the frequency exclusion list comprises information regarding one or more operating bands having one or more operating frequencies overlapped with one or more operating frequencies of the first operating band, and
   performing power scan and cell search according to the frequency search list for the first operating band and the frequency search list for the second operating band,
   wherein the second operating band comprises one or more operating frequencies overlapped with one or more operating frequencies of the first operating band, and the one or more operating frequencies of the second operating band overlapped with that of the first operating band is/are listed only in one of the frequency search list for the first operating band and the frequency search list for the second operating band, and wherein the operating bands listed in the support band list including the first operating band and the second operating band are operating bands of the same Radio Access Technology (RAT).

2. The communications apparatus as claimed in claim 1, wherein when generating the frequency search list for the first operating band, the processor further obtains information regarding the second operating band according to the frequency exclusion list, and determines whether the frequency search list for the second operating band has been generated, and when the frequency search list for the second operating band has been generated, the processor excludes the one or more operating frequencies of the first operating band overlapped with that of the second operating band from the frequency search list.

3. The communications apparatus as claimed in claim 2, wherein when the frequency search list for the second operating band has not been generated, the processor further determines whether a duplex mode of the first operating band is the same as a duplex mode of the second operating band, and when the duplex mode of the first operating band is different from that of the second operating band, the-processor marks a search mode of the one or more operating frequencies of the first operating band overlapped with that of the second operating band as a dual search mode.

4. The communications apparatus as claimed in claim 3, wherein the duplex mode is selected from a group comprising a Time Division Duplex (TDD) mode and a Frequency Division Duplex (FDD) mode.

5. The communications apparatus as claimed in claim 1, wherein the processor further generates a frequency search list for the other operating band(s) listed in the support band list, and the processor further performs power scan and cell search for the other operating band(s) according to the corresponding frequency search list(s).

6. The communications apparatus as claimed in claim 5, wherein the frequency search lists for the operating bands listed in the support band list are generated for performing a full band network search.

7. The communications apparatus as claimed in claim 2, wherein the information regarding the second operating band in the frequency exclusion list comprises information regarding a band index of the second operating band, information regarding a start operating frequency of the one or more operating frequencies overlapped with that of the first operating band, and information regarding a range of the one or more operating frequencies overlapped with that of the first operating band.

8. A method executed by a processor of a communications apparatus for performing an efficient network search, comprising:

generating a frequency search list for a first operating band listed in a support band list, wherein the support band list comprises information regarding a plurality of operating bands supported by the communications apparatus for wireless communications, each operating band ranges over a plurality of operating frequencies, and the frequency search list comprises information regarding one or more operating frequencies located in the first operating band to be searched;

obtaining a frequency exclusion list corresponding to the first operating band, wherein the frequency exclusion list comprises information regarding one or more operating bands having one or more operating frequencies overlapped with one or more operating frequencies of the first operating band;

obtaining information regarding a second operating band from the frequency exclusion list corresponding to the first operating band;

determining whether a frequency search list for the second operating band has been generated;

excluding one or more operating frequencies of the first operating band overlapped with that of the second operating band from the frequency search list for the first operating band when the frequency search list for the second operating band has been generated; and performing power scan and cell search on the one or more operating frequencies in the frequency search list for the first operating band, wherein the operating bands listed in the support band list including the first operating band and the second operating band are operating bands of the same Radio Access Technology (RAT).

9. The method as claimed in claim 8, wherein when the frequency search list for the second operating band has not been generated, the method further comprises: determining whether a duplex mode of the first operating band is the same as a duplex mode of the second operating band; and when the duplex mode of the first operating band is different from that of the second operating band, marking a search mode of the one or more operating frequencies of the first operating band overlapped with that of the second operating band as a dual search mode.

10. The method as claimed in claim 9, wherein the duplex mode is selected from a group comprising a Time Division Duplex (TDD) mode and a Frequency Division Duplex (FDD) mode.

11. The method as claimed in claim 8, further comprising: generating a frequency search list for the other operating band(s) listed in the support band list according to a frequency exclusion list corresponding to the other operating band(s); and performing power scan and cell search for the other operating band(s) according to the corresponding frequency search list(s).

12. The method as claimed in claim 11, wherein the frequency search lists for the operating bands listed in the support band list are generated for the communications apparatus to perform a full band network search.

13. The method as claimed in claim 8, wherein the information regarding the second operating band in the frequency exclusion list comprises information regarding a band index of the second operating band, information regarding a start operating frequency of the one or more operating frequencies overlapped with that of the first operating band, and information regarding a range of the one or more operating frequencies overlapped with that of the first operating band.

* * * * *